United States Patent

Slone

[15] 3,676,933

[45] July 18, 1972

[54] CONTINUOUS THICKNESS MEASUREMENT OF A MOVING PLASTIC WEB

[72] Inventor: Thomas J. Slone, Forest Park, Ohio

[73] Assignee: The Proctor & Gamble Company, Cincinnati, Ohio

[22] Filed: Oct. 9, 1969

[21] Appl. No.: 865,120

[52] U.S. Cl. .............................. 33/147 L, 33/182, 33/172 E
[51] Int. Cl. ..................... G01b 5/00, G01b 5/14, G01b 7/00
[58] Field of Search .............. 33/143 R, 147 B, 147 L, 147 N, 33/182, 148 H

[56] References Cited

UNITED STATES PATENTS

| 883,831 | 4/1908 | Robertson | 33/147 B |
|---|---|---|---|
| 1,446,300 | 2/1923 | Lawrence | 33/147 L |
| 1,969,536 | 8/1934 | Winne | 33/148 H |
| 2,308,033 | 1/1943 | Terry | 33/148 H |
| 2,474,117 | 6/1949 | Rendel | 33/147 L |
| 3,056,208 | 10/1962 | Martland | 33/147 N |
| 3,476,481 | 11/1969 | Lemelson | 33/143 R |

Primary Examiner—William D. Martin, Jr.
Assistant Examiner—A. J. Mirabito
Attorney—Frederick H. Braun and John V. Gorman

[57] ABSTRACT

The thickness of a moving plastic web is continuously monitored as it passes between a pair of co-acting rollers including a web support roller driven at a peripheral speed which corresponds to the linear speed of the moving web and a freely rotating idler roller mounted over the support roller. The periphery of the idler roller is in contact with the web passing over the support roller. The idler roller is resiliently mounted to permit radial movement in response to variations in web thickness. An electromagnetic proximity sensor is associated with the idler roller to sense and detect changes in its relative position which are ultimately transmitted to a control or recorder. The device includes a suitable mechanism for simultaneously moving the rollers laterally with respect to the web in order to obtain a web thickness profile.

4 Claims, 3 Drawing Figures

INVENTOR
Thomas J. Slone

BY Fredrick H. Brown

ATTORNEY

CONTINUOUS THICKNESS MEASUREMENT OF A MOVING PLASTIC WEB

BACKGROUND OF THE INVENTION

The present invention is particularly well suited for continuously measuring the thickness of a moving web. It has been found to have great utility in the measurement of web thickness of dough or similar products of plastic consistency that are highly sensitive to distortion caused by forces acting on the web. For example, the invention has been used to measure the thickness of a moving web of raw dough.

The prior art suggests a number of devices for detecting and measuring variations in thickness of a moving web. However, these prior devices are designed for use with relatively stiff webs which can be acted upon with forces that will not cause distortion. This is in complete contrast to the manner of handling needed for a moving web of raw dough or similar products of plastic consistency.

Consequently, the prior art can be briefly summarized as being directed to devices which will actually deform or distort material of plastic consistency such as raw dough or the like if applied to such materials. The present invention is directed to the problem of providing a thickness measuring device which would overcome the shortcomings of the prior art so that accurate thickness measurements can be made continuously on raw dough without any detrimental forces being imparted to the product being measured.

SUMMARY OF THE INVENTION

The nature and substance of the invention will be more readily appreciated after giving consideration to its major objectives which are recited for convenience in the ensuing paragraphs.

A major object of the invention is the provision of a device for continuously measuring the thickness of a moving plastic web with a high degree of accuracy and reliability.

Another object of the invention is the provision of a device of the above character which has the capability of being applied to the continuous measurement of thickness of dough-like or plastic webs without causing any damage, distortion or any other undesirable effects upon the web.

Still another object of the invention is the provision of a device of this character which incorporates a driven support for the moving web in order to achieve the foregoing objectives.

A further object of the invention is the provision of a device for continuously measuring thickness by sensing the spacing between a pair of rollers having parallel axes including the incorporation of a mechanism for moving the rollers transversely of the web in order to obtain a web thickness profile.

These and other objects are achieved by providing a pair of spaced cooperating, parallel rollers in which the lower roller provides a support for the moving web. The lower roller is synchronously driven so that its peripheral speed is matched with the linear speed of the moving web. The lower support roller is at least twice the width of the web being measured and the two rollers are mounted in a fixed relative relationship with respect to each other. The device is provided with means for simultaneously moving the upper and lower rollers transversely in order to obtain a thickness profile by the use of a suitable sensor as the upper roller moves across the web.

BRIEF DESCRIPTION OF THE DRAWING

While the specification concludes with claims particularly pointing out and distinctly claiming the subject matter regarded as forming the present invention, it is believed the invention will be better understood from the following description taken in connection with the accompanying drawing in which:

DESCRIPTION OF THE PREFERRED EMBODIMENT

As previously stated, the present invention has utility in the continuous monitoring of thickness of continuously moving webs of plastic material. In a preferred embodiment, the device is especially suitable for continuous thickness measurements of a moving web of raw dough. In fact, the device has been applied in thickness measurements of raw dough in the production of a chip type snack food product. To be specific, it has been applied in combination with a machine of the kind described and claimed in U.S. Pat. No. 3,520,248 issued to Robert G. MacKendrick July 14, 1970 which is entitled CHIP FRYING MACHINE, said patent being commonly owned by the assignee of the present invention.

Figure 1:
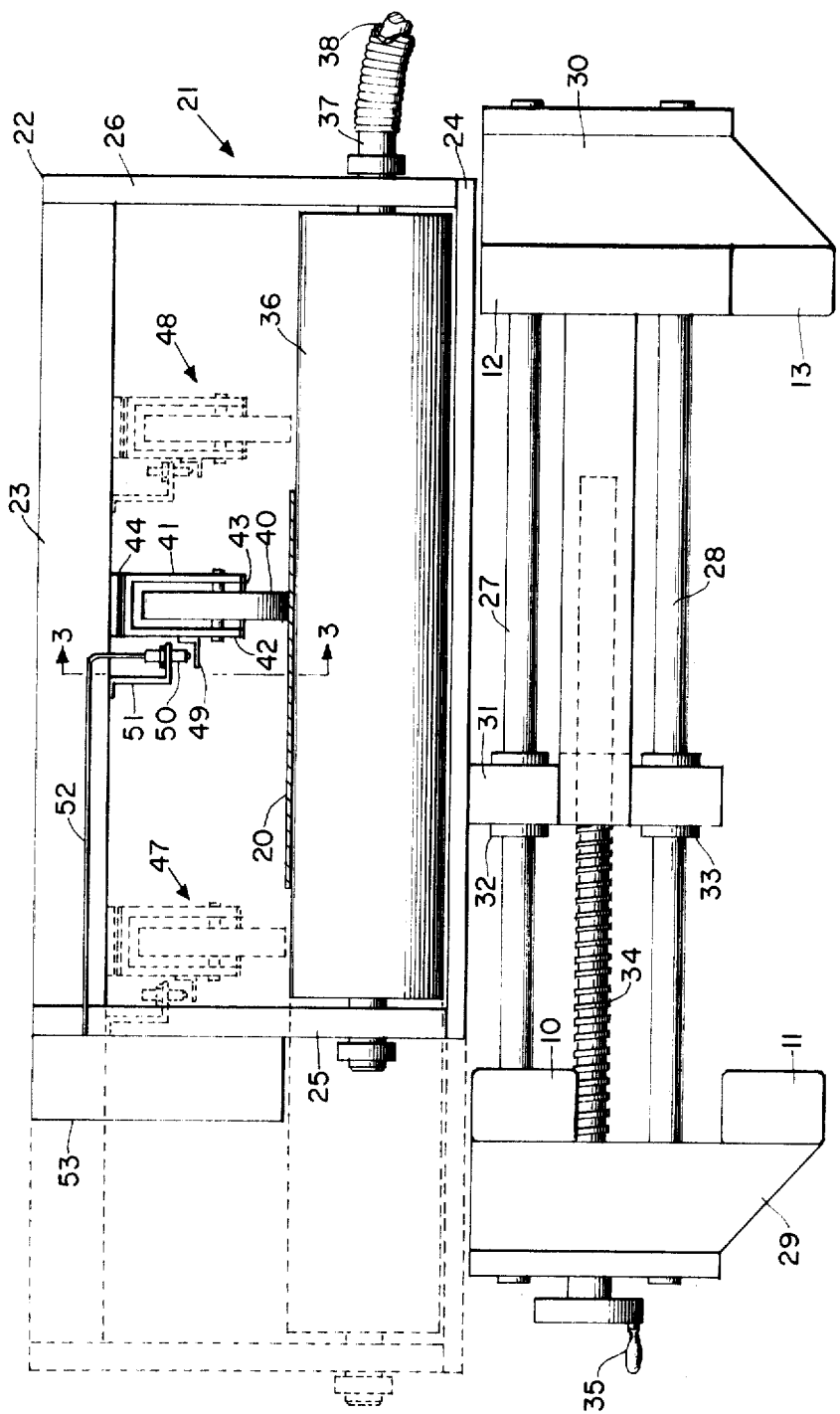
FIG. 1 is an end elevation of the device of the invention illustrating its major components in operative relationship.
Figure 2:
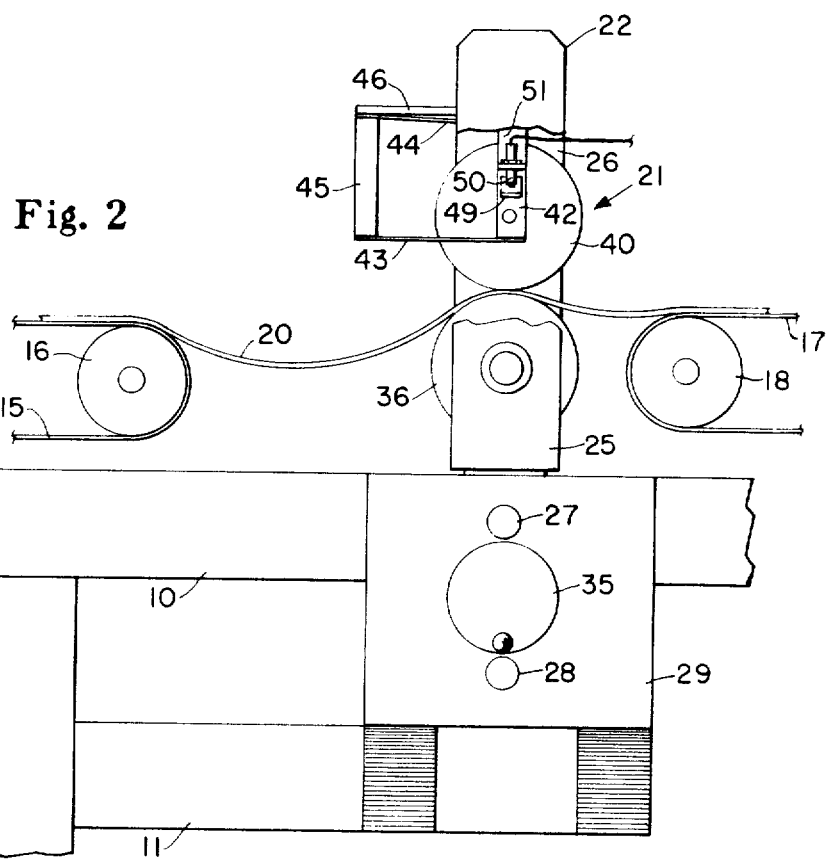
FIG. 2 is a fragmentary side elevation of the device of FIG. 1 illustrating the manner in which the web is supported by the lower roller and showing the relative relationship of the idler roll and the proximity sensor.

The salient features of the present device are generally shown in FIGS 1 and 2 wherein it is illustrated in mounted position on a machine of the kind described in the aforesaid MacKendrick application. From the drawings it will be noted that the device is mounted on horizontal support members 10, 11, 12 and 13 which form a portion of the main frame of the machine, there being a portion of a vertical support 14 shown in FIG. 2. Additionally, one end of a continuously moving conveyor 15 is illustrated as supported by the idler pulley 16 which is suitably supported by means that will be apparent to those skilled in the art. Similarly, a continuously moving conveyor 17 is supported by the pulley 18 for the purpose of moving and supporting the web of raw dough 20 after it has passed through the web thickness monitoring device shown generally at 21.

The monitoring device 21 includes a roller support frame 22 comprising horizontal upper and lower support members 23 and 24 and vertical support members 25 and 26. The roller support frame 22 is supported and mounted for lateral movement on the way bars 27 and 28 which extend transversely between the supports 29 and 30 which are mounted, respectively, on the horizontal support members 10—11 and 12—13. A downwardly extending slide support 31 is secured to the underside of the lower horizontal support member 24. Bearings 32 and 33 are secured in the slide support 31. The bearings 32 and 33 are mounted for sliding movement on the way bars 27 and 28, respectively, such that the roller support frame 22 can be moved laterally and positioned as desired.

The device includes means for moving the roller support frame transversely of the web 20. This includes a lead screw 34 threaded in the slide support 31. The lead screw 34 is journalled in the support 29 and has a handwheel 35 secured to its outer end for turning same. It will thus be apparent that turning the handwheel 35 will simultaneously turn the lead screw 34. This results in moving the roller support frame 22 laterally from side to side so that it can be positioned as desired by the operator.

A pair of spaced, cooperating, parallel rollers are mounted in fixed relative axial position within the roller support frame 22. These rollers include a lower web supporting roller 36, the ends of which are journalled in the vertical support members 25 and 26 there being a shaft 37 extending beyond the vertical support member 26. A driving means is attached to the shaft 37. The driving means preferably takes the form of a sheathed flexible shaft 38 driven synchronously with the chip frying machine from a suitable power takeoff. In this way the support roller 36 is synchronously driven with the machine such that its surface speed (i.e. the linear speed of the periphery of the roller) is substantially the same as the linear speed of the moving web 20. This provides a support for the moving web 20 which eliminates any undue stresses or forces acting on the web in order to prevent stretching or tearing thereof which would be highly undesirable.

Figure 3:
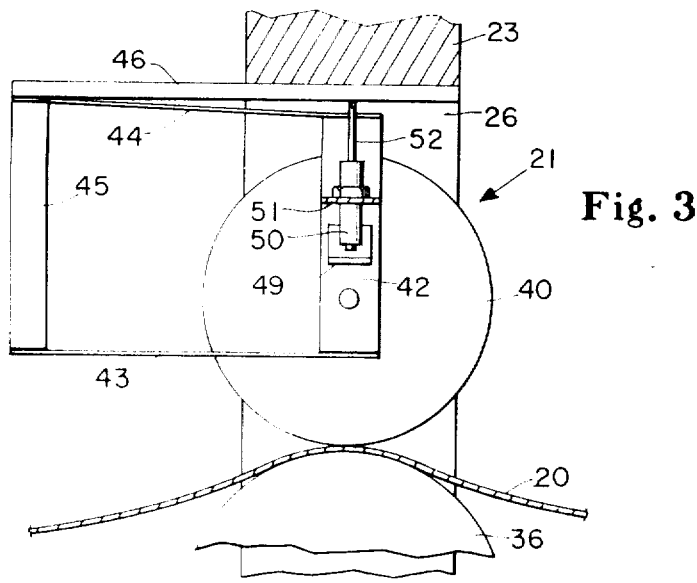
FIG. 3 is a cross section taken on the line 3—3 of FIG. 1 illustrating the resilient support for the upper idler roll and the relative relationship of the other associated components.

As best illustrated in FIG. 3, an idler roller 40 is provided that is freely rotatable between the supports 41 and 42 (FIG. 1). As illustrated in all the views of the drawings, the idler roller 20 is in contact with the web 20. Its function is to sense the thickness of the web 20 as it passes over the lower roller 36. That is, the rollers 36 and 40 have their axes in parallel and the center distance between the axes is varied by the thickness of the web 20 interposed therebetween. A mechanism (to be described) urges the idler roller 40 toward the support roller 36 with only the slightest force in order to avoid any distortion of the web 20.

The mechanism for resiliently urging the idler roller 40 into contacting relation with the web 20 includes the vertical supports 41 and 42 in which the idler roller 40 is freely journalled. The supports 41 and 42 are, in turn, secured to the resilient members 43 and 44, the outer ends of which are attached to the vertical support 45 which is secured to the extending member 46, the latter being secured to the horizontal upper support member 23. The configuration of the structural members which support the idler roller 40 is in the form of a parallelogram as will be appreciated by viewing FIG. 3 (i.e., the members 42, 43, 44 and 45). The resilient members 43 and 44 are preferably made from a thin springy material such that they have the action of leaf springs. This characteristic of the members 43 and 44 when coupled with the configuration of the idler roller support provides a support structure which responds quickly and accurately with a minimum of distortion to changes in thickness of the web sensed by peripheral contact of the idler roller 40.

The length of the lower web supporting roller 36 must be at least twice the width of the web 20. This is needed to permit movement of the idler roller 40 to a first position 47 where it rides on the roller 36 beyond one edge of the web 20 to a second position 48 where it rides on the roller 36 beyond the other edge of the web 20. It will be apparent, of course, that changes in the position of the idler roller 40 are controlled by turning of the lead screw 34 by means of the handwheel 35. When the idler roller 40 is moved to the position 47 or 48 wherein it loses contact with the web 20, the pressure by the idler roller 40 on the surface of the support roller 36 is essentially negligible.

A sensing means is provided which preferably is an electromagnetic proximity sensor for sensing the thickness of the web 20 in response to radial movement of the idler roller 40. As best illustrated in FIGS. 1 and 3, the proximity sensor includes a ferromagnetic member or conductive plate 49 secured to the support 42 and a coil 50 suspended from the horizontal support member 23 by means of the bracket 51. The signal sensed by the coil 50 is transmitted through the leads 52 to a control component 53.

Because of the structure previously described, it will be apparent that the distance between the lower end of the coil 50 and the conductive plate 49 will be dependent upon the thickness of the web 20 as sensed by the idler roller 40. Thus, the magnetic field generated by the coil 50 is effected by the spatial position of the conductive plate 49 and this signal is transmitted to the control component 53. The output of the control component 53 may be used to drive various types of recorders, oscilloscopes, x-y plotters, voltmeters and/or limit switches. In a preferred construction, the output is recorded and may also control the spacing between a pair of sheeting rolls used in the manufacture of the raw dough web. In some cases it may be satisfactory to mount the coil 50 on the support 41 or 42 with its sensing end directly over and in close proximity to the surface of the web 20 as it passes over the support roller 36. In these latter cases, the conductive plate 49 may be eliminated.

The proximity sensor is capable of accurately gauging distances without contacting the surface of the material being gauged. It has been found that the coil 50 for this particular service is preferably a model 308 detector for a Bently Nevada 3000 Series Proximitor as manufactured by the Bently Nevada Corporation of Minden, Nevada 89423. Similarly, the control component 53 for sensing the thickness of raw dough is preferably a model 3100N Detector Driver for a Bently Nevada 3000 Series Proximitor as also manufactured by the Bently Nevada Corporation.

Other types of sensing means or devices that may be used for the detection of changes in relative position of the rollers 36 and 40 include the use of a capacitance between two plates, one of which is secured to the roller support frame and the other of which is movably secured to the support for the idler roller 40. Still another type of sensing device is a linear variable differential transformer in which the transformer core is moved in response to changes of position of the idler roller, the signal being suitably transmitted for use in an appropriate control component.

The use of a sensor of the preferred type as previously described which includes a coil 50 and a conductive plate 49 provides a sensitive measure of web thickness since the distance between the coil 50 and the plate 49 varies directly as the distance between the axis of the support roller 36 and the axis of the idler roller 40. Because the distance between the axis of the support roller 36 and the axis of the idler roller 40 varies directly as the thickness of any material between them, the mechanism can be calibrated to continuously monitor the inferred thickness of a continuous web or sheet product.

The mechanism further provides that the idler roller 40 will always ride above the same portion of the support roller 36 so that variation of the roller diameter throughout its length will not affect calibration. Also, eccentricities of the idler roller 40 and the support roller 36 will not affect the precision of the mechanism because of filtering and electrically zeroing while running without the web between the idler roller 40 and support roller 36 but with the support roller 36 supporting the web and roller surface-speed synchronized with the web.

The previously described mechanism further provides for lateral movement of the roller support frame 22 to position the idler roller 40 off either edge of the web 20 for dynamic zero calibration and to any position across the width of the web 20. The lateral movement can be manual or motor powered but lateral velocity is limited through the provision of lead screw 34 to prevent skewing or tearing of the web while traversing.

If desired, two or more sensors can be mounted with separate idler rollers, each with independent mountings operated in a fixed lateral relationship to the roller 36 for the continuous monitoring and/or detection of product-sheet taper.

Other variations to the basic concept described above will be apparent to those skilled in the art. Consequently, the foregoing description is not intended to limit the scope of the invention in any way. It was merely intended to set forth a preferred embodiment to which the invention is not specifically limited. Accordingly, it will be understood that the scope of the invention is not to be limited by this preferred description.

What is claimed as new is:

1. In a device for continuously measuring the thickness of a moving plastic web, said device having a pair of spaced, cooperating, parallel rollers including a support roller and an idler roller between which the web to be measured passes,
  said support roller and said idler roller being mounted in a roller support frame with their axes in parallel with the support roller mounted beneath the idler roller means for maintaining said idler roller in contact with said web as it passes beneath the idler roller and in which the thickness of the web is determined by sensing means associated with said idler roller, the improvement comprising:
  a. driving means for the support roller to rotate said support roller such that the peripheral speed of the support roller is substantially the same as the linear speed of said moving web;
  b. said support roller having a length which is at least equal to twice the width of said web, c. said idler and support rollers being in a fixed, relative position wherein they are immovable along their axes with respect to one another,
d. means for simultaneously moving said idler roller and said support roller transversely of said web to obtain a web thickness profile,
e. idler roller support means for resiliently mounting said idler roller such that it normally is urged into contact with said web under slight pressure to obviate distortion and damage to the web, said last mentioned means including a vertically extending roller support member in which the idler roller is freely journalled, a pair of substantially parallel resilient members extending rearwardly from said roller support member, the outer ends of said resilient members having a vertical support member interposed and suspended from said roller support frame such that the configuration of the idler roller support is substantially in the form of a parallelogram to provide a support structure that responds quickly and accurately to changes in web thickness with a minimum of distortion.

2. The device set forth in claim 1 wherein said drive means comprises a flexible shaft for continuously driving said support roller irrespective of its transverse position with respect to said web.

3. The device set forth in claim 1 wherein said moving means comprises at least one way, a roller support frame containing said rollers and mounted for sliding movement on said way and a lead screw for transversely moving said roller support frame on said way.

4. The device set forth in claim 2 wherein said moving means comprises at least one way, a roller support frame containing said rollers and mounted for sliding movement on said way and a lead screw for transversely moving said roller support frame on said way.

* * * * *